D. MAY.
Vehicle Wheel-Hub.
No. 208,748.
Patented Oct. 8, 1878.
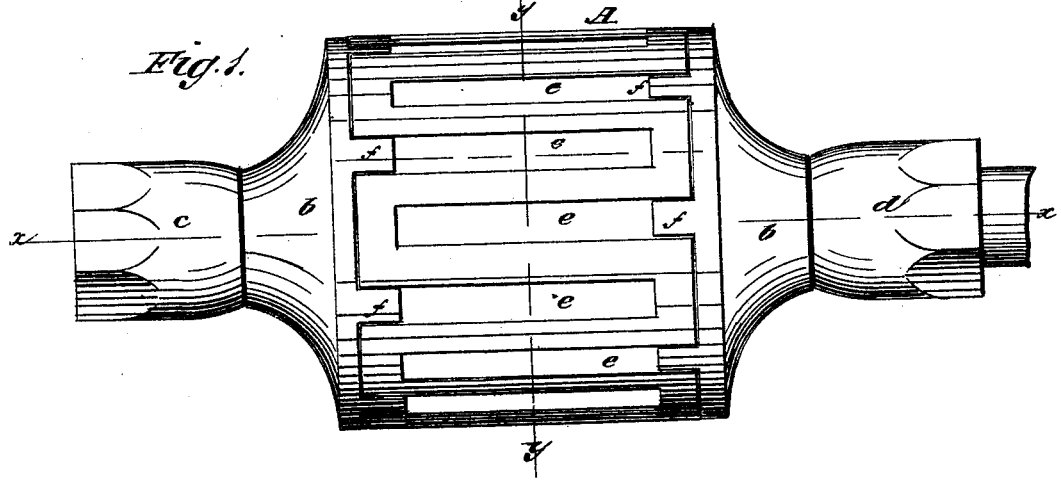
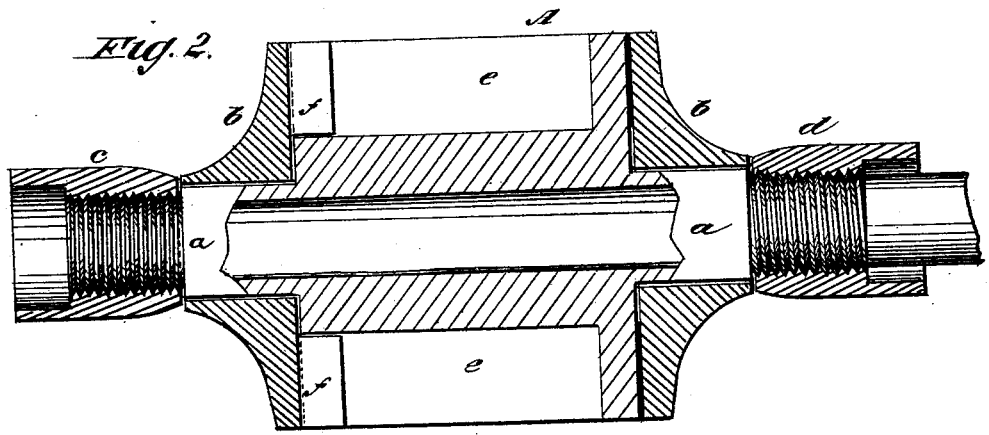
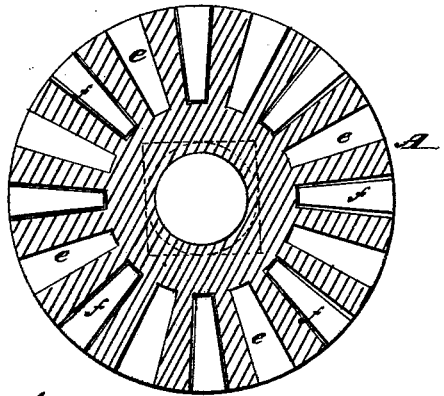
WITNESSES:
Francis McArdle
C. Sedgwick
INVENTOR:
D. May
BY Munn & Co.
ATTORNEYS.

UNITED STATES PATENT OFFICE.

DANIEL MAY, OF LUMBERTON, NORTH CAROLINA.

IMPROVEMENT IN VEHICLE-WHEEL HUBS.

Specification forming part of Letters Patent No. 208,748, dated October 8, 1878; application filed August 31, 1878.

*To all whom it may concern:*

Be it known that I, DANIEL MAY, of Lumberton, in the county of Robeson and State of North Carolina, have invented a new and Improved Wheel-Hub, of which the following is a specification:

My invention consists in a hub having mortises in the axle-box for the spokes, which mortises are open at alternate sides, and collars having projections on their inner faces to enter the mortises in the axle-box, so that the mortises are closed after the spokes are inserted. The collar at one side closes the openings on that side, and the openings at the opposite side are closed by the other collar.

In the accompanying drawing, Figure 1 is a side elevation of one of my improved hubs. Fig. 2 is a section taken on line $x\,x$, and Fig. 3 is a cross-section at the line $y\,y$.

Similar letters of reference indicate corresponding parts.

The central axle-box, A, of the hub is formed with square ends or projections $a$, for the collars $b$ to sit upon, so that the latter cannot turn. The collars $b$ are retained and clamped by nuts $c\,d$, that screw upon the ends $a$ outside the flanges.

The axle-box A of the hub is formed with radial mortises $e$, that open alternately at opposite sides, and each flange $b$ is formed with projecting lugs $f$ on its face, corresponding in number and position with the mortises $e$, that open at the side where the collar is placed, so that the lugs $f$ enter the mortises and bear against the spokes therein. Each collar $b$ will therefore retain and clamp one-half the number of spokes.

As shown in the drawing, the hub receives the axle in the usual manner, and is adapted to hold the spokes in a straight line; but if it is desired to fit the spokes out of line, or staggering, the space between the closed ends of each mortise and the edge of the hub A will be made wider than the lugs are long, and the tenons of the spokes will thereby be thrown to the right and left alternately.

The nut $d$ is formed with a projecting edge, as shown, which comes over the flange of the axle, (not shown,) and serves as a dust-cap. The nut $c$ is made in a similar manner with a circular flange, which serves as the point-band.

In case a spoke requires to be replaced, it is only necessary to remove the nut and collar, drive out the spoke, and insert a new one, without removing the tire and felly or loosening the other spokes. If the spoke requiring removal is held by the other collar, the operation will be the same at that side.

The mortises, being formed with the axle-box, are much stronger than when cast upon flanges, and the alternate formation adds to the strength of the hub. The collars cannot turn, and when clamped in place by the nuts the parts are solid and firm.

I am aware that it is not new to make a hub of two wooden end sections and an interposed spoke-holder, or of two disks, each of which is provided with tenons.

Having thus described my invention, I claim as new and desire to secure by Letters Patent—

A wheel-hub consisting of axle-box A, having open-ended mortises $e$ and end-threaded extensions, squared at $a$, the collars $b\,b$, having inward projections $f$, and the nuts $c\,d$, as shown and described.

DANIEL MAY.

Witnesses:
   A. W. FULLER,
   R. F. LEWIS.